United States Patent
Ogura

(10) Patent No.: US 9,807,011 B2
(45) Date of Patent: Oct. 31, 2017

(54) MOBILE TERMINAL, CONTROL NODE, PACKET TRANSFER NODE, AND METHOD FOR CONTROLLING CONGESTION

(71) Applicant: NEC Corporation, Toyko (JP)

(72) Inventor: Daisuke Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 322 days.

(21) Appl. No.: 14/417,807

(22) PCT Filed: Mar. 25, 2013

(86) PCT No.: PCT/JP2013/002017
§ 371 (c)(1),
(2) Date: Jan. 28, 2015

(87) PCT Pub. No.: WO2014/020792
PCT Pub. Date: Feb. 6, 2014

(65) Prior Publication Data
US 2015/0195202 A1    Jul. 9, 2015

(30) Foreign Application Priority Data

Jul. 31, 2012 (JP) ................................. 2012-169647

(51) Int. Cl.
*H04L 12/28* (2006.01)
*H04L 12/801* (2013.01)
(Continued)

(52) U.S. Cl.
CPC ............ *H04L 47/115* (2013.01); *H04L 47/31* (2013.01); *H04M 3/00* (2013.01); *H04W 28/02* (2013.01);
(Continued)

(58) Field of Classification Search
None
See application file for complete search history.

(56) References Cited

U.S. PATENT DOCUMENTS

| 8,809,328 B2 | 8/2014 | Kawagishi et al. |
| 2011/0002224 A1 | 1/2011 | Tamura |

(Continued)

FOREIGN PATENT DOCUMENTS

| JP | 2011-015288 | 1/2011 |
| WO | 2012/147750 | 1/2012 |

OTHER PUBLICATIONS

Japanese Office Action for Patent Application No. 2012-169647 dated Aug. 30, 2016, with English translation.
3GPP TS 36.300 V9.9.0 (Dec. 2011) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).
(Continued)

*Primary Examiner* — Zewdu A Beyen
(74) *Attorney, Agent, or Firm* — Young & Thompson

(57) ABSTRACT

In one embodiment, a mobile terminal (10) includes a wireless communication network (101) capable of connecting to a mobile communication network (1), a packet processing unit (102), and a control unit (103). The packet processing unit (102) transmits or receives a user packet through the wireless communication unit (101). The control unit (103) transmits, to the mobile communication network (1), a message indicating whether or not to permit setting a congestion indication marking to an Explicit Congestion Notification (ECN)-enabled user packet in the mobile communication network (1).

20 Claims, 11 Drawing Sheets

(51) Int. Cl.
*H04M 3/00* (2006.01)
*H04W 28/02* (2009.01)
*H04L 12/833* (2013.01)
*H04M 1/725* (2006.01)

(52) U.S. Cl.
CPC ... *H04W 28/0247* (2013.01); *H04W 28/0252* (2013.01); *H04M 1/72583* (2013.01)

(56) References Cited

U.S. PATENT DOCUMENTS

| | | | |
|---|---|---|---|
| 2011/0032935 A1* | 2/2011 | Yang | H04L 47/10 370/389 |
| 2012/0087245 A1* | 4/2012 | Leung | H04L 47/12 370/236 |
| 2013/0201823 A1* | 8/2013 | Gupta | H04W 28/12 370/230 |

OTHER PUBLICATIONS

3GPP TS 26.114 V9.9.0 (Jun. 2012) 3rd Generation Partnership Project; Technical Specification Group Services and System Aspects; IP Multimedia Subsystem (IMS); Multimedia Telephony; Media handling and interaction (Release 9).
International Search Report PCT/JP2013/002017 dated May 28, 2013.
"RTCP usage with ECN", 3GPP TSG-SA4#61 S4-100775, Nov. 8, 2010, pp. 1-6.

* cited by examiner

MOBILE TERMINAL, CONTROL NODE, PACKET TRANSFER NODE, AND METHOD FOR CONTROLLING CONGESTION

TECHNICAL FIELD

The present invention relates to congestion control in a mobile communication network.

BACKGROUND ART

ECN (Explicit Congestion Notification) is known as a congestion control technique in an IP (Internet Protocol) network. ECN is defined by IETF (Internet Engineering Task Force) RFC 3168, "The Addition of Explicit Congestion Notification (ECN) to IP". ECN enables notification of congestion in an IP network on an end-to-end basis. ECN can be effectively used when two end nodes (hosts) both support ECN and rooters in an IP network also support ECN.

ECN uses two lower bits of a TOS (Type of Service) field having one octet (8 bits) defined in an IP header. These two bits are referred to as ECN fields or ECN bits, and indicate one of the four following codepoints:
  00: Not ECN-Capable Transport (Not-ECT);
  10: ECN Capable Transport (ECT(0));
  01: ECN Capable Transport (ECT(1)); and
  11: Congestion Experienced (CE).
where The Not-ECT codepoint "00" indicates that a sender host does not support ECN or does not use ECN; two ECN Capable Transport (ECT) codepoints "10" and "01" indicate that sender and destination end nodes both support ECN and an IP packet, is using ECN; and the Congestion Experienced (CE) codepoint "11" is set by a rooter to notify congestion in the network to end nodes.

When experiencing congestion, a rooter rewrites an ECN field of an IP packet to which the ECT (0) or ECT (1) codepoint has been set, i.e., an ECN-enabled IP packet, to the CE codepoint ("11"). When the CE codepoint has been set to an IP packet, routers positioned in a downstream of a packet flow do not change the ECN field of this IP packet. When receiving an IP packet to which the CE codepoint has been set, a destination end node handles the congestion notification in an upper layer protocol (e.g., TCP (Transport Layer Protocol) or RTP (Real-time Transport Protocol)). The destination end node which has received the CB codepoint notifies the sender end node of the congestion by, for example, setting an ECE (ECN-Echo) flag of a TCP header or using a RTP message. The sender end node, which has received the notification, for example, reduces a TCP transmission window size or a codec rate to reduce a transmission data rate.

Further, IETF RFC 3168, IETF RFC 4301 "Security Architecture for the Internet Protocol", RFC 6040 "Tunneling of Explicit Congestion Notification" and the like disclose an operation of a tunnel end point when ECN-enabled IP packets are encapsulated. For example, IETF RFC 4301, which is related to IPsec, discloses operations of a tunnel ingress end point and egress end point as follows. The tunnel ingress end point copies an ECN field of a header of an arriving IP packet (i.e., an inner IP header) to an ECN field of an outer header of the tunnel. Meanwhile, when a CE field of an inner IP header indicates the ECT(0) or ECT(1) codepoint; and the CE codepoint is marked, in. an outer header, the tunnel egress end point copies an ECN field of the outer header to the inner header, in other cases, the tunnel egress end point does not change the ECN field of the inner IP header.

The above-described ECN is also applied to a 3GPP (Third Generation Partnership Project) mobile communication network. More specifically, section 11.6 of 3GPP TS 36.300 defines congestion notification on a radio link between a base station (eNB: evolved NodeB) and a mobile terminal (UE: User Equipment). Further, 3GPP TS 26.114 defines use of ECN in MTSI (Multimedia Telephony Service for IP Multimedia Subsystem), i.e., a speech codec, and, more particularly, defines a behavior of a mobile terminal when the mobile terminal receives the CE codepoint. According to 3GPP TS 36.300, in order to increase capacity (e.g., in terms of number of accepted VoIP (Voice over IP) calls) or to improve coverage, a base station sets the CE codepoint to PDCP SDUs (Packet Data Convergence Protocol Service Data Unit), i.e., user packets, which is indicating the ECT(0) or ECT(1) codepoint.

CITATION LIST

Non Patent Literature

[Non Patent Literature 1] 3GPP TS 36.300 V9.9.0 (2011-12)
[Non Patent Literature 2] 3GPP TS 26.114 V9.9.0 (2012-06)

SUMMARY OF INVENTION

Technical Problem

As described above, ECN is a technique where a packet transfer node (e.g., router) in a network notifies congestion to a destination end node (e.g., mobile terminal) by setting congestion indication markings (e.g., CE codepoints) to data packets. The present inventor has conducted detailed study on use of ECN in a mobile communication network, and has found various problems.

for example, in using ECN in a 3GPP mobile communication network, there is a problem that a mobile terminal cannot indicate to the mobile communication network whether the setting of congestion indication markings (e.g., CE codepoints) to ECN-enabled user packets (e.g., user packets to which ECT codepoints are set) is permitted of restricted. The mobile terminal communicates with an end node through, for example, a radio access network, a core network and an external packet network. Hence, preferably, the mobile terminal can explicitly permit or restrict the setting of congestion indication markings to user packets in a specific network, for example, to identify a point where congestion occurs.

Further, upon use of ECN in the 3GPP mobile communication, network, all ECN-enabled user packets (e.g., user packets to which ECT codepoints are set) are commonly handled. That is, when congestion is detected, congestion indication markings are set to ECN-enabled user packets regardless of to which mobile terminal or service the user packets are related. There is thus a problem that a mobile communication network cannot control the setting of congestion indication markings at a fine granularity such as per individual mobile terminal or per individual service used by a mobile terminal.

The technical ideas obtained by the present inventor to solve various problems including the above two problems contribute to improving application of ECN to a mobile communication network. Some specific examples of the technical ideas will be apparent from the description of the following embodiments and the drawings. An object of the present invention is to provide a mobile terminal, a control node, a packet transfer node, a method of controlling congestion and a program which can solve at least one of various problems related to use of ECN in a mobile communication network.

Solution to Problem

In an aspect, a mobile terminal includes a wireless transceiver, a control unit and a packet processing unit. The wireless transceiver is configured to be connected to a mobile communication network. The control unit is configured to transmits, to the mobile communication network through the wireless transceiver, a message indicating whether or not to permit setting a congestion indication marking to an Explicit Congestion Notification (ECN)-enabled user packet in the mobile communication network. The packet processing unit is configured to transmit or receive the user packet through the wireless transceiver.

In an aspect, a method, performed by a mobile terminal for controlling congestion, includes transmitting, to a mobile communication network through a wireless transceiver, a message indicating whether or not to permit setting a congestion indication marking to an Explicit Congestion Notification (ECN)-enabled user packet in the mobile communication network.

In an aspect, a program includes instructions to cause a computer to perform the above-described, method performed by a mobile terminal for controlling congestion.

In an aspect, a control node, arranged in a mobile communication network, includes a control unit. The control unit is configured to notify a packet transfer node within the mobile communication network whether the setting of a congestion indication marking to an Explicit Congestion Notification (ECN)-enabled user packet transmitted or received by a mobile terminal is permitted or not.

In an aspect, a method for controlling congestion, performed by a control node arranged in a mobile communication network, includes notifying a packet transfer node within the mobile communication network whether the setting of a congestion indication marking to an Explicit Congestion Notification (ECN)-enabled user packet transmitted or received by a mobile terminal is permitted or not.

In an aspect, a program includes instructions to cause a computer to perform the above-described method, performed by a control node arranged in a mobile communication network, for controlling congestion.

In an aspect, a packet transfer node, arranged in a mobile communication network, includes a packet processing unit and a control unit. The packet processing unit is configured to set a congestion indication marking to an Explicit Congestion Notification (ECN)-enabled user packet or a tunnel packet that encapsulates the user packet. The control unit is configured to control the setting of the congestion indication marking by the packet processing unit, in accordance with a control message indicating whether or not to permit setting the congestion indication marking. The control message indicates at least one of: the mobile terminal; a service used by the mobile terminal; a Quality of Service (QoS) level used by the mobile terminal; and a bearer related to the mobile terminal, as a target for which the setting of the congestion indication marking is permitted or restricted.

In an aspect, a method for controlling congestion, performed by a packet transfer node arranged in a mobile communication network, includes (a) controlling the setting of a congestion indication marking in accordance with a control message indicating whether or not to permit setting the congestion indication marking, and (b) on a condition that the setting of the congestion indication marking has been permitted in the controlling, setting the congestion indication marking to an Explicit Congestion Notification (ECN)-enabled user packet or a tunnel packet that encapsulates the user packet. The control message indicates at least one of: the mobile terminal; a service used by the mobile terminal; a Quality of Service (QoS) level used by the mobile terminal; and a bearer related to the mobile terminal, as a target for which the setting of the congestion indication marking is permitted or restricted.

In an aspect, a program includes instructions to cause a computer to perform the above-described method, performed by a packet transfer node arranged in a mobile communication network, for controlling congestion.

Advantageous Effects of Invention

According to the above aspects, it is possible to provide a mobile terminal, a control node, a packet transfer node, a method of controlling congestion and a program which can solve any one of various problems related to use of ECN in a mobile communication network.

DESCRIPTION OF EMBODIMENTS

Hereinafter, specific embodiments will be described in detail with reference to the drawings. Throughout the drawings, the same or corresponding components are denoted by the same reference symbols, and repetitive explanation will be omitted as needed for clarity of explanation.

First Embodiment

Figure 1:
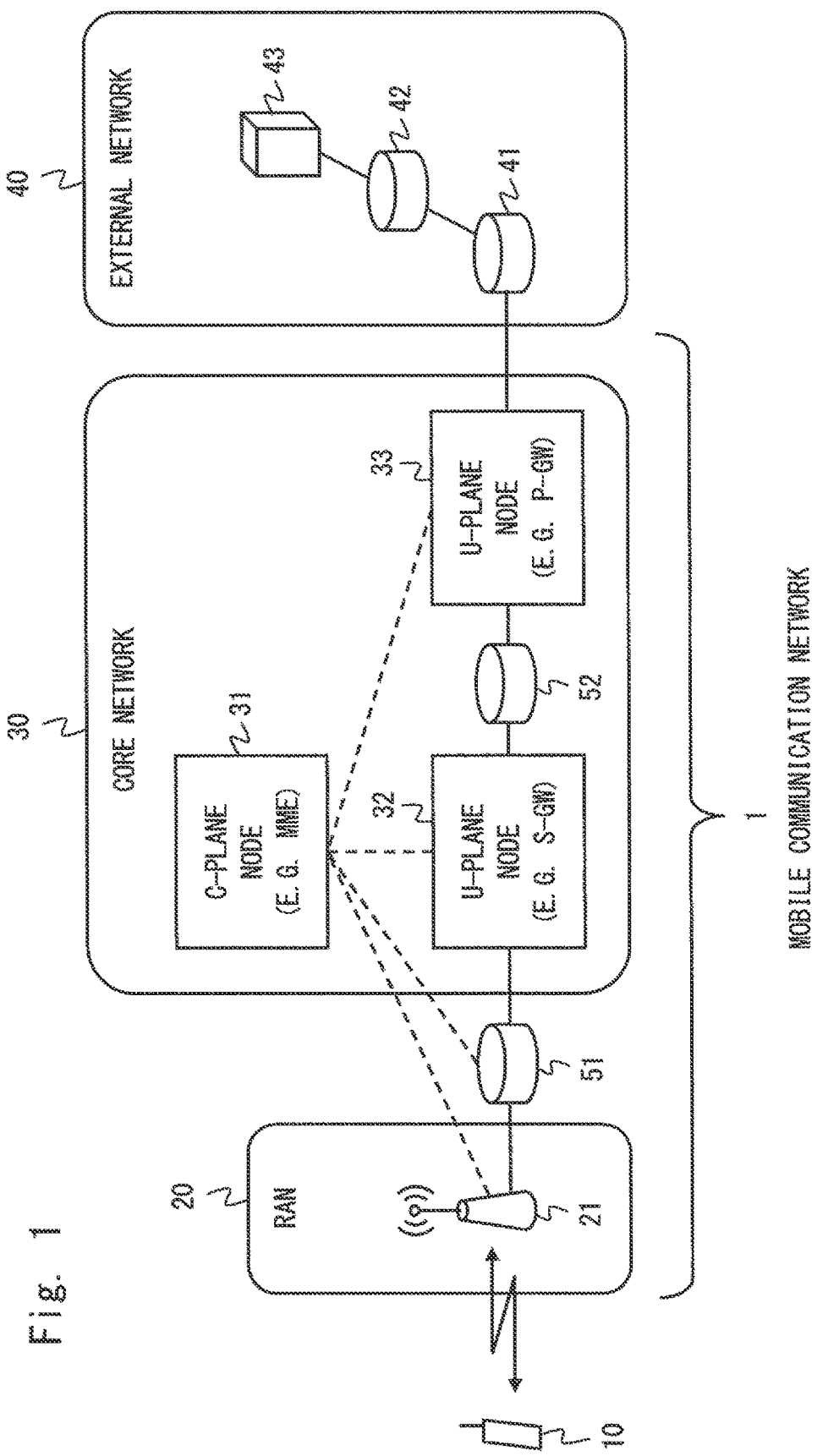
FIG. 1 is a diagram, showing an illustrative configuration of mobile communication network according embodiments.

FIG. 1 illustrates a configuration example of a mobile communication, network 1 according to some embodiments including the first embodiment. The mobile communication network 1 includes a radio access network (RAN) 20 and a core network 30. The RAN 20 is, for example, a UTRAN (Universal Terrestrial Radio Access Network) or an E-UTRAN (Evolved UTRAN) of 3GPP, or a combination thereof. The RAN 20 includes a base station 21. and a radio resource management function. The radio resource management function is implemented in a RAN node different from the base station 21 in some cases or is implemented in the base station 21 in some cases. For example, in the UTRAN, the radio resource management function is implemented in a RNC (Radio Network Controller) different from a base station (Node B). Meanwhile, in the E-UTRAN, the radio resource management function is integrally implemented in a base station (eNB: Evolved NodeB).

The core network 30 is, for example, a GPRS (General Packet Radio Service) packet core or an EPC (Evolved packet Core) of 3GPP, or a combination thereof. The core network 30 is connected to the RAN 20, and has a function of relaying user packets transferred between a mobile terminal 10 and an external network 40. Further, the core network 30 performs, for example, mobility management, session management (bearer management) and the like related to the mobile terminal 10. The core network 30 includes one or a plurality of user plane nodes (U-plane nodes) and one or a plurality of control plane nodes (C-plane nodes). FIG. 1 illustrates an example of two U-plane nodes 32 and 33 and one C-plane node 31. However, each of these nodes .may include two or more nodes.

The U-plane nodes 32 and 33 each perform processing of transferring (e.g., routing and forwarding) user packets. Further, the U-plane nodes 32 and 33 each have bearer terminating functions, i.e., terminating functions of a tunneling protocol such as a GTP (GPRS Tunneling Protocol), a GRE (Generic Routing Protocol) or an IPsec. In case of the GPRS packet core, the U plane nodes 32 and 33 include U-plane functions of an SGSN (Serving GPRS Support Node) and a GGSN (Gateway GPRS Support Node). Further, in case of the EPC, the U-plane nodes 32 and 33 include an S-GW (Serving Gateway) arid a P-GW (Packet Data Network Gateway).

The C-plane node 31 performs, for example, mobility management, session management (bearer management) and the like of the mobile terminal 10. The C-plane node 31 may include a VoIP call control function. In case of the GPRS packet core, the C-plane node 31 includes a C-plane function of an SGSN (Serving GPRS Support Node). Further, in case of the EPC, the C-plane node 31 includes an MME (Mobility Management Entity). Furthermore, the C-plane node 31 may include a SIP (Session Initiation Protocol) server such as a 3GPP CSCF (Call Session Control Function) for VoIP call control.

Routers 51 and 52 each perform rooting and forwarding of user packets, more specifically, tunnel packets (e.g., GTP tunnel packets, GRE tunnel, packets and IPsec packets) that encapsulate user packets, in the RAN 20, in the core network 30 or between the RAN 20 and the core network 30. The routers 51 and 52 are, for example, IP routers.

The external network 40 is a packet data network. The external network 40 is, for example, the Internet, a core network of another mobile operator, a non-3GPP radio access network or a combination thereof. In an example in FIG. 1, the external network 40 includes routers 41 and 42 and an end node 43. The end node 43 performs packet communication (e.g., a Web access, a VoIP call, a voice chat, a video chat, a live video streaming or an online game) with the mobile terminal 10. That is, the end node 43 receives user packets (e.g., IP packets) transmitted from, the mobile terminal 10, and transmits user packets to the mobile terminal 10.

Further, each network element illustrated, in FIG. 1 supports ECN (Explicit Congestion Notification). ECN is typically defined by IETF RFC 3168. However, ECN in the present specification may be different form that defined by IETF RFC 3168. More specifically, ECN in the present specification only needs to be a technique which informs an end node about congestion in a network by utilizing methods, protocols or architecture similar to that of IETF RFC 3168. In other words, in ECN in the present specification, a network node only needs to set a congestion indication marking to a user packet transmitted from an end node, or to a tunnel packet that encapsulates a user packet.

In addition, the configuration in FIG. 1 is only exemplary. For example, a corresponding end node which performs packet communication with the mobile terminal 10 may be another mobile terminal 10 connected to the mobile communication network 1.

ECN control according to the present embodiment will hereinafter be described. First, an operation of the mobile terminal 10 is described. The mobile terminal 10 according to the present embodiment is configured to transmit, to the mobile communication network 1, a request message indicating whether or not to permit setting congestion indication markings (e.g., CE codepoints) to user packets in the mobile communication network 1. Further, the request message triggers signaling in the mobile communication network 1 for applying, to at least one packet transfer node (e.g., the base station 21, the U-plane node 32 or 33 or the router 51 or 52) in the mobile communication network 1, whether or not to permit setting the congestion indication markings.

This request message typically relates to the setting of congestion indication markings to ECN-enabled user packets. Setting a congestion indication marking to an ECN-disenabled user packet is also naturally restricted in IETF RFC 3168 and 3GPP TS 36.300. Note that, an ECN-enabled user packet is a data packet that is transmitted from an ECN supporting end node, and is a data packet to which the setting of a congestion indication marking is permitted, according to conventional ECN architecture. For example, an ECN-enabled user packet is an IP packet whose header is set with the ECT (ECN-Capable Transport) codepoint. That is, the mobile terminal 10 according to the present embodiment can request that the mobile communication network 1 does not set congestion indication markings to ECN-enabled user packets.

Not permitting the setting of a congestion indication marking (e.g., CE codepoint) to an ECN-enabled user packet also means restricting rewriting an ECN field within the user packet. That is, when setting a congestion indication marking is not permitted, even if a setting condition of the congestion indication marking has been satisfied, the ECN field, of the user packet is maintained at a value at the time when the user packet is received by the mobile communication network 1. An example of setting conditions of a congestion indication marking is that a packet transfer node (e.g., the base station 21, the U-plane node 32 or 33 or the router 51 or 52) in the mobile communication network 1 detects congestion. Further, another example of setting conditions of a congestion indication marking is that a congestion indication marking has been set to a header (outer header) of a tunnel packet that is received by a tunnel end point (e.g., the base station 21 or the U-plane plane node 32 or 33).

The request message transmitted from the mobile terminal 10 may indicate, for example, whether or not to permit the setting of congestion indication markings per individual service used, by the mobile terminal 10. Services used by the mobile terminal .10 are, for example, a VoIP call, a video chat, an Internet, access and the like. In addition, these services can be distinguished based on, for example, following (a) to (d), and hence the request message transmitted from the mobile terminal 10 may indicate whether or not to permit the setting of congestion indication markings per individual QoS or bearer (tunnel) used by the mobile terminal 10:

(a) an address of the end node 43 which the mobile terminal 10 communicates with;
(b) an address of the external network 40 to which, the mobile terminal 10 is connected or a gateway node thereof (e.g., a GGSN or a P-GW);
(c) a QoS (Quality of Service) level of a user packet; or
(d) a bearer (e.g., an EPS (Evolved Packet System.) bearer, a MBMS (Multimedia Broadcast and Multicast Service) bearer, or a tunnel (e.g., a GTP tunnel, a GRE tunnel or an IPsec tunnel)) used to transfer a user packet.

The request message transmitted from the mobile terminal 10 may indicate a transfer direction (i.e. uplink or downlink) in which setting congestion indication markings is permitted or restricted.

The mobile terminal 10 may transmit a request message to the C-plane node 31 in the core network 30. The C-plane node 31 is configured to signal to packet transfer nodes within the mobile communication network 1 in order to perform bearer management (e.g., creation, modification or deletion of bearers). Consequently, the C-plane node 31 receives the request message, thereby being easy to notify a packet transfer node of permission or restriction to set congestion indication markings to user packets.

The request message from the mobile terminal 10 may be a NAS (Non-Access Stratum) message, related to creation or modification of a bearer, to be transmitted to the C-plane node 31. The NAS message may be, for example, an attach request, a service request, a bearer allocation request, a hearer modification request or a request for creation of a connection with, an external network. The bearer modification request requests to, for example, modify a QoS level of a bearer. Specific examples of these NAS messages include at least one of an Attach Request message, a Service Request message, a PDN connectivity request message, a Bearer Resource Allocation Request message and a Bearer Resource Modification Request message. These NAS messages relate to creation and modification of a bearer. Consequently, by using these NAS messages, it is possible that the mobile terminal 10 easily notifies the C-plane node 31 of a policy for setting congestion indication markings on bearers (i.e., to user packets transferred through the bearers) to be created or modified in response to the NAS messages.

The following is a description of an operation of the C-plane node 31. The C-plane node 31 is configured to receive the above request message from the mobile terminal 10. Further, the C-plane node 31 is configured, in response to the request message, to notify a packet transfer node in the mobile communication network 1 (e.g., the base station 21, the U-plane node 32 or 33 or the router 51 or 52) of permission or restriction to set congestion indication markings to user packets transmitted or received by the mobile terminal 10. More specifically, the C-plane node 31 may send a control message to a packet transfer node.

The control message transmitted from the C-plane node 31 may indicate the mobile terminal 10 (an identifier of the mobile terminal 10) as a target for which the setting of congestion indication markings is permitted or restricted. It is thereby possible to permit or restrict the setting of congestion indication, markings only to user packets transmitted or received by the specific mobile terminal 10. In other words, it is possible to control permission to set congestion indication markings per individual mobile terminal. Further, the control message transmitted from the C-plane node 31 may indicate at least one of a service used by the mobile terminal 10, a service data flow transmitted or received by the mobile terminal 10, a QoS level used by the mobile terminal 10, and a bearer which is terminated by the mobile terminal 10. It is thereby possible to permit or restrict the setting of congestion indication markings only to part of services (service data flows, QoS levels, or bearers) used by the mobile terminal 10. In other words, it is possible to control permission to set congestion indication markings per individual service, individual QoS level or individual bearer used by the mobile terminal 10.

The control message transmitted from the C-plane node 31 may indicate a transfer direction (a downlink direction or an uplink direction) in which setting congestion indication markings is permitted or restricted. It is thereby possible to permit or restrict the setting of congestion indication markings only in one of the downlink direction and the uplink direction.

The following describes an operation of a packet transfer node (e.g., the base station 21, the U-plane node 32 or 33 or the router 51 or 52). The packet transfer node is configured to support ECN, and be able to set congestion indication markings to ECN-enabled user packets (or tunnel packets that encapsulate the user packets). Further, the packet transfer node is configured to control the setting of congestion indication markings to user packets or tunnel packets in accordance with the control message from the C-plane node 31. For example, when the control message indicates restriction that setting congestion indication markings to user packets (or tunnel packets) of the mobile terminal 10 is restricted, even if a setting condition of the congestion indication markings has been satisfied, the packet transfer node does not set the congestion indication markings to the user packets (or the tunnel packets) of the specified mobile terminal 10.

As described above, the control message from the C-plane node 31 may indicate permission to set congestion indication markings per service, per QoS level or per bearer. In this case, the packet transfer node may permit or restrict the setting of congestion indication markings only to part of a plurality of bearers related to the mobile terminal 10. For example, in UMTS and EPS, packet flows (i.e. service data flows) of services connected to the different external networks 40 or packet flows of different QoS levels are transferred using different bearers. Consequently, the packet transfer node can distinguish between, services (in other words, service data flows of the mobile terminal 10) used by the mobile terminal 10 based on different bearers (tunnels).

Figure 2:
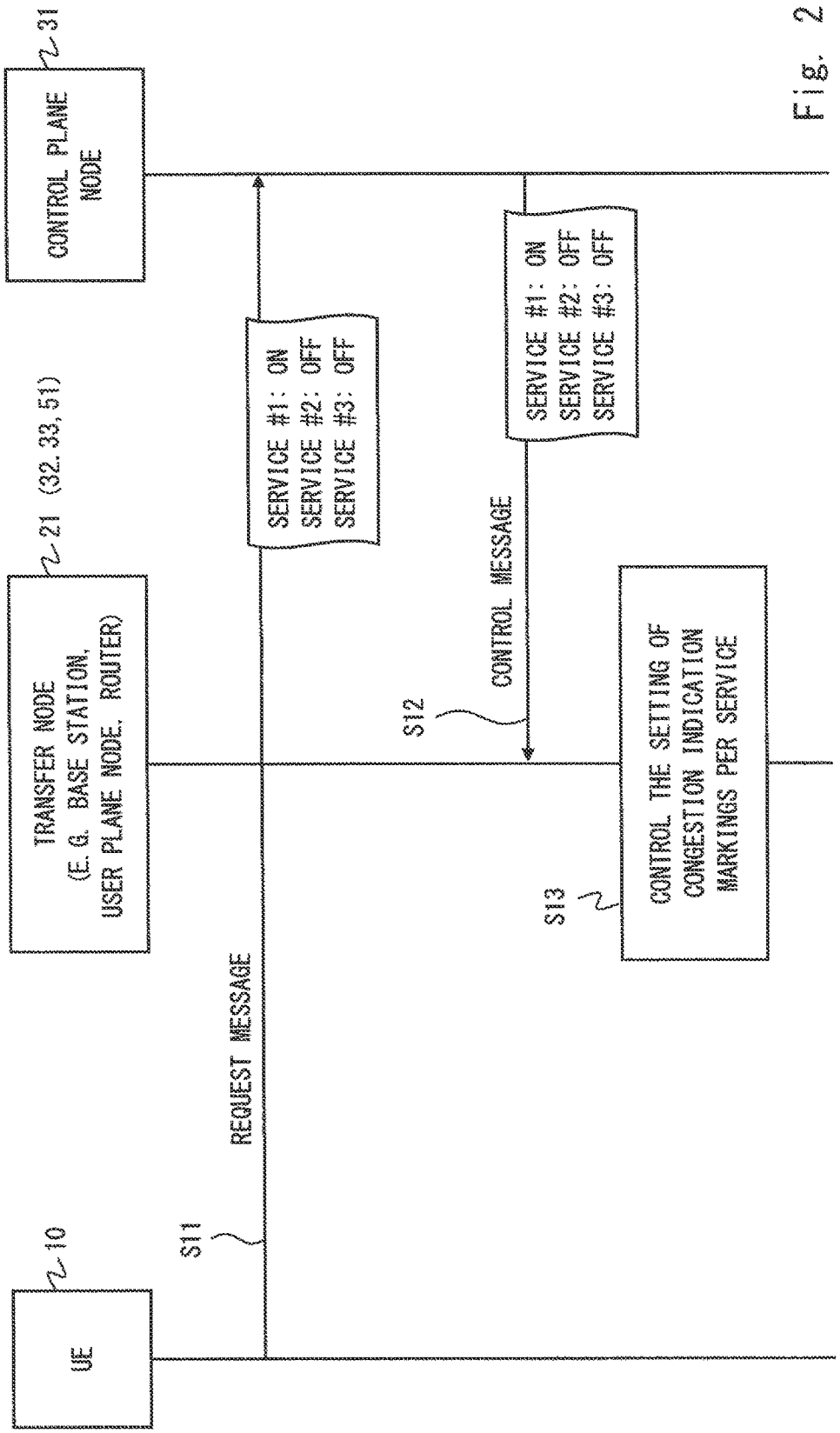
FIG. 2 is a sequence diagram showing an example of a procedure for controlling permission to set a congestion indication marking according to embodiments.

FIG. 2 shows a sequence diagram illustrating, an example of a procedure for controlling permission to set congestion indication markings according to the present embodiment. In step S11, the mobile terminal 10 (UE 10 in FIG. 2) sends a request message to the C-plan node 31. In the example in FIG. 1, the request message from the mobile terminal 10 indicates whether or not to permit setting congestion indication markings for three respective services (#1, #2 and #3). More specifically, setting the congestion indication marking to user packets of the service #1 is permitted (ON), and setting the congestion indication marking to user packets of the services #2 and #3 is restricted (OFF). Note that, alternatively, permissions/restrictions to set congestion indication markings for a plurality of services may be transmitted using a plurality of request messages each corresponding a respective service. Further, a service may be indicated by a QoS level, an external network 40 (e.g., APN (Access Point Name) or a bearer. For example, when a NAS message (e.g., an Attach Request, a Service Request or a Bearer Resource Allocation Request) related to creation or modification of a bearer is used as the request message from the mobile terminal 10, the request message may indicate whether or not to permit setting congestion indication markings related to a bearer to be created or modified in response to the request message.

In step S12, the C-plane node 31 sends a control message to at least one packet node (e.g., the base station 21, the U-plane node 32 or 33 or the router 51 or 52) in response to the request message in step S11. In the example shown in FIG. 2, the control message indicates that the setting congestion indication markings to user packets of the service #1 related to the mobile terminal 10 is permitted (ON) and setting congestion indication markings to user packets of the services #2 and #3 is restricted (OFF). Packet transfer routes to different services may differ from each other. In this case, the C-plane node 31 may send the control message to nodes on a packet transfer route of each service.

In step S13, the packet transfer node controls the setting of congestion indication markings to user packets per service in accordance with the control message from the C-plane node 31.

Figure 5:
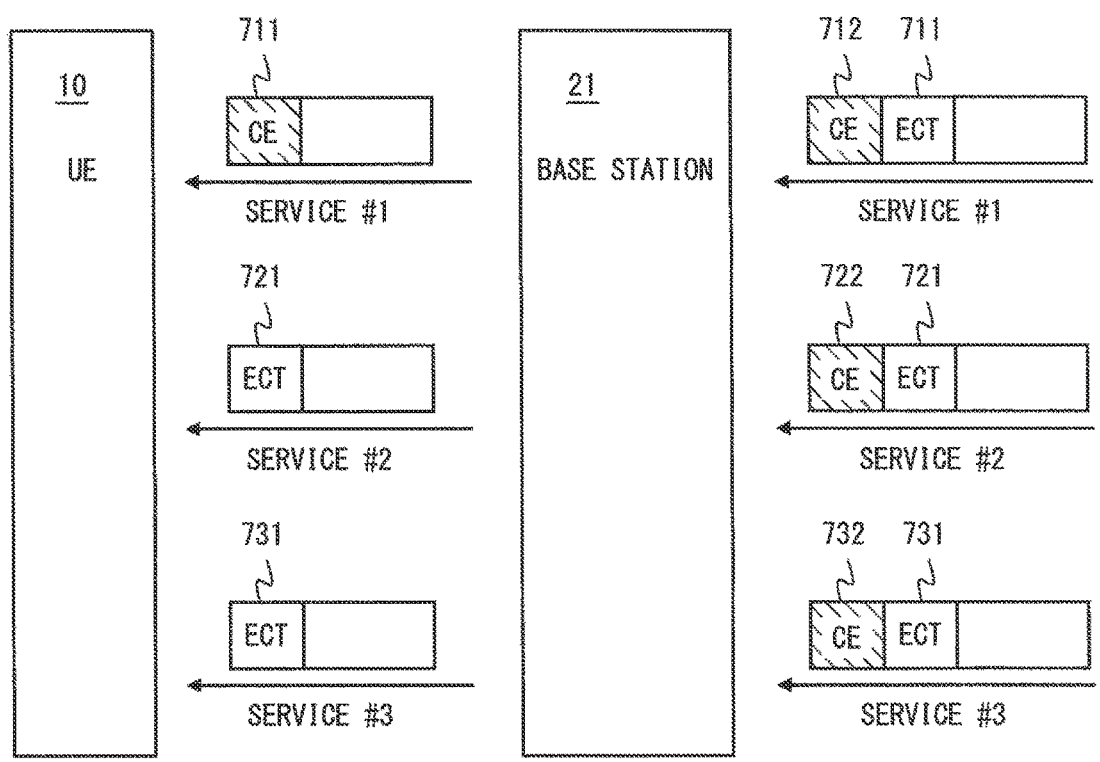
FIG. 5 is a sequence diagram for explaining an illustrative operation performed by a base station according to embodiments.
Figure 6:
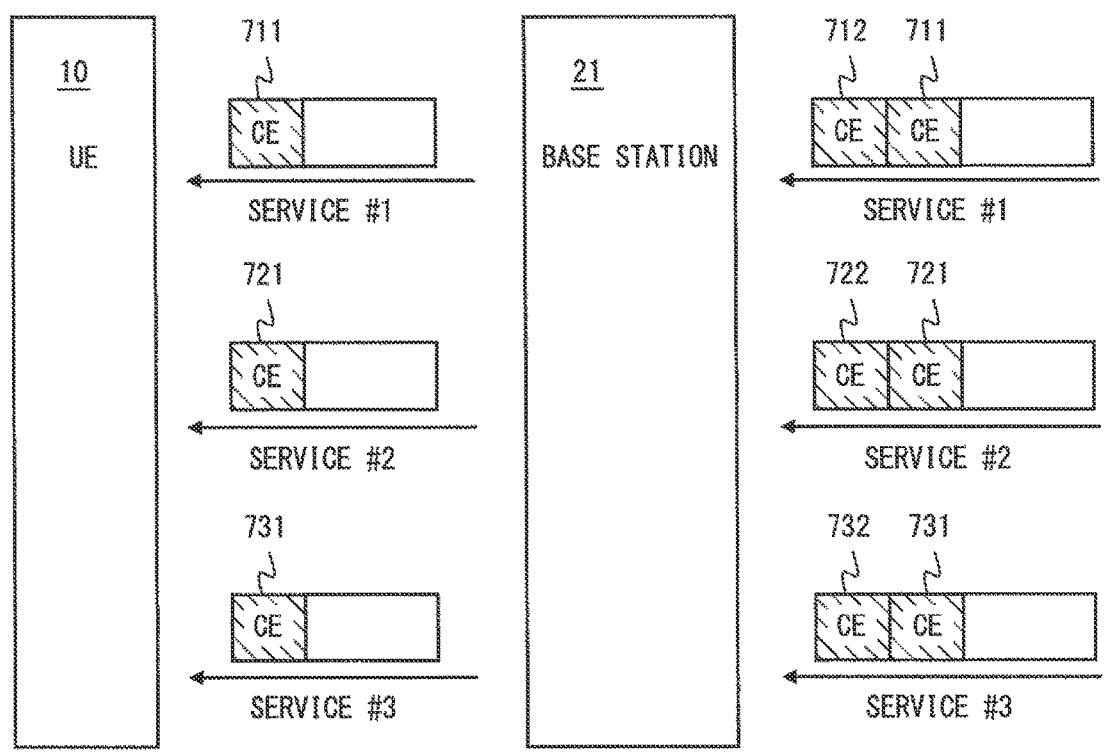
FIG. 6 is a sequence diagram for explaining an illustrative operation performed by a base station according to embodiments.
Figure 7:
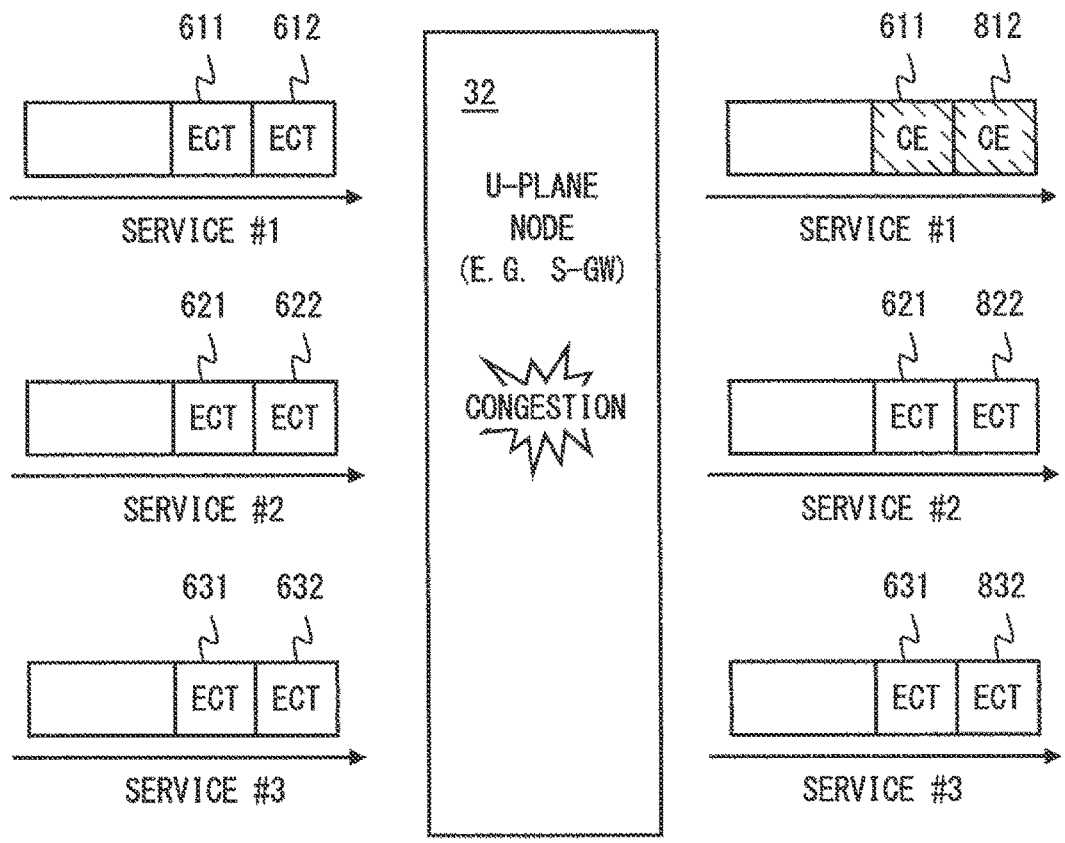
FIG. 7 is a sequence diagram, for explaining an illustrative operation performed by a user plane node according to embodiments.
Figure 8:
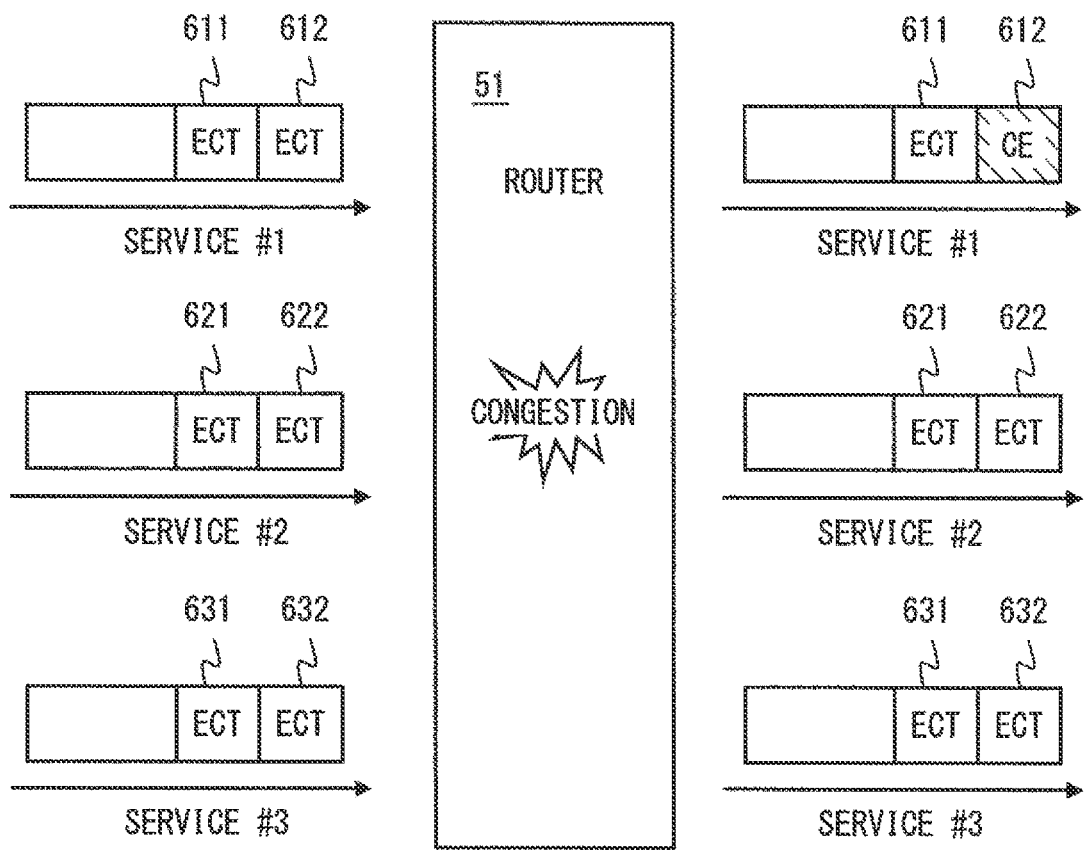
FIG. 8 is a sequence diagram for explaining an illustrative operation performed by a router according to embodiments.

The following describes, with reference to FIGS. 3 to 8, specific examples of an operation to set congestion indication markings performed by a packet transfer node within the mobile communication network 1. FIGS. 3 to 6 illustrate operations of the base station 21. FIG. 7 illustrates an operation of the U-plane node 32 (e.g., the SGSN or the S-GW) within the core network 30. Further, FIG. 8 illustrates an operation of the router 51 arranged between the base station 21 and the U-plane node 32. In these examples, according to IETF RFC 3168, the ECT codepoint has been set to each ECN-enabled packet and the CE codepoint is used as the congestion indication marking. Further, in these examples, setting congestion indication markings to user packets of the service #1 is permitted (ON) and setting congestion indication markings to user packets of the services #2 and #3 is restricted (OFF), similar to the example shown in FIG. 2.

Figure 3:
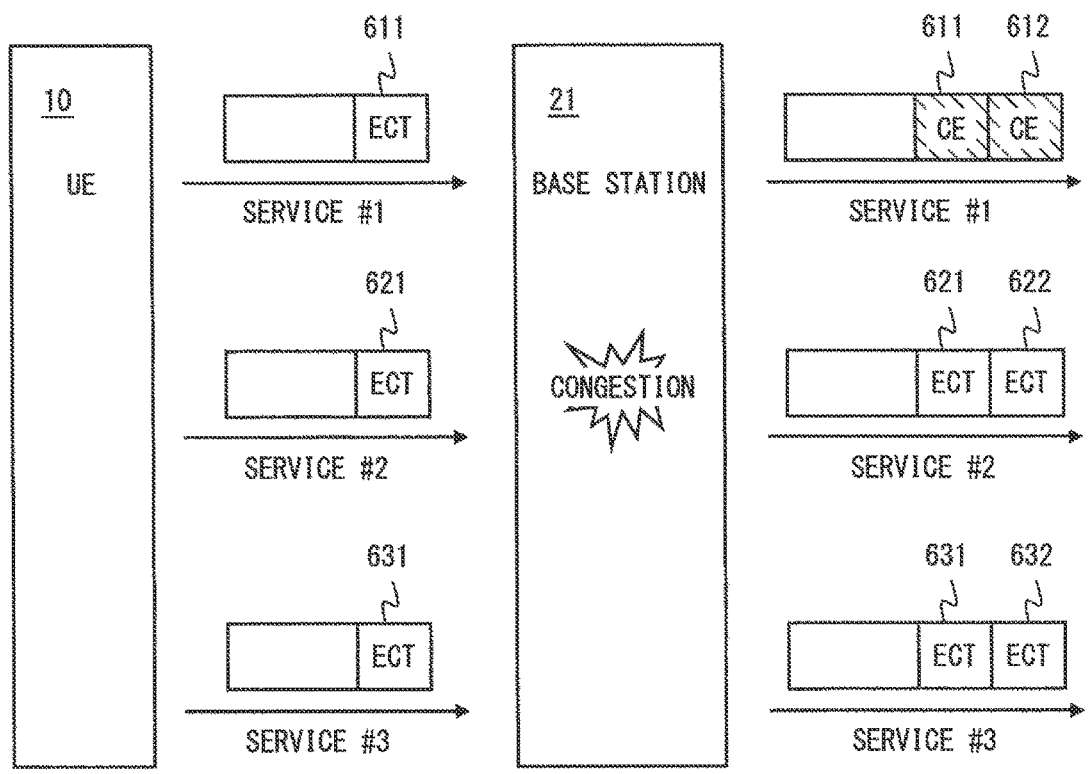
FIG. 3 is a sequence diagram for explaining an illustrative operation performed by a base station according to embodiments.

FIG. 3 illustrates an example of an operation to set CE codepoints to uplink user packets when the base station 21 detects congestion. The base station 21 receives uplink user packets related to the services #1, #2 and #3 from the mobile terminal 10 through radio hearers. The base station 21 has been permitted (ON) to set congestion indication markings to user packets of the service #1 based on the instruction form the C-plane node 31. Hence, as illustrated in FIG. 3, the base station 21. rewrites the ECT codepoint within an IP header (inner header) 611 of the uplink user packet of the service #1 to the CE codepoint, and also sets the CE codepoint to an outer header 612 related to a bearer (e.g., GTP tunnel) between the base station 21 and the U-plane node 32. Meanwhile, since congestion indication markings to user packets of the services #2 and #3 are not. permitted, the base station 21 does not change the ECT codepoints within IP headers (inner headers) 621 and 631 of the uplink user packets of the services #2 and #3, and sets the ECT codepoints to the outer headers 622 and 632.

Figure 4:
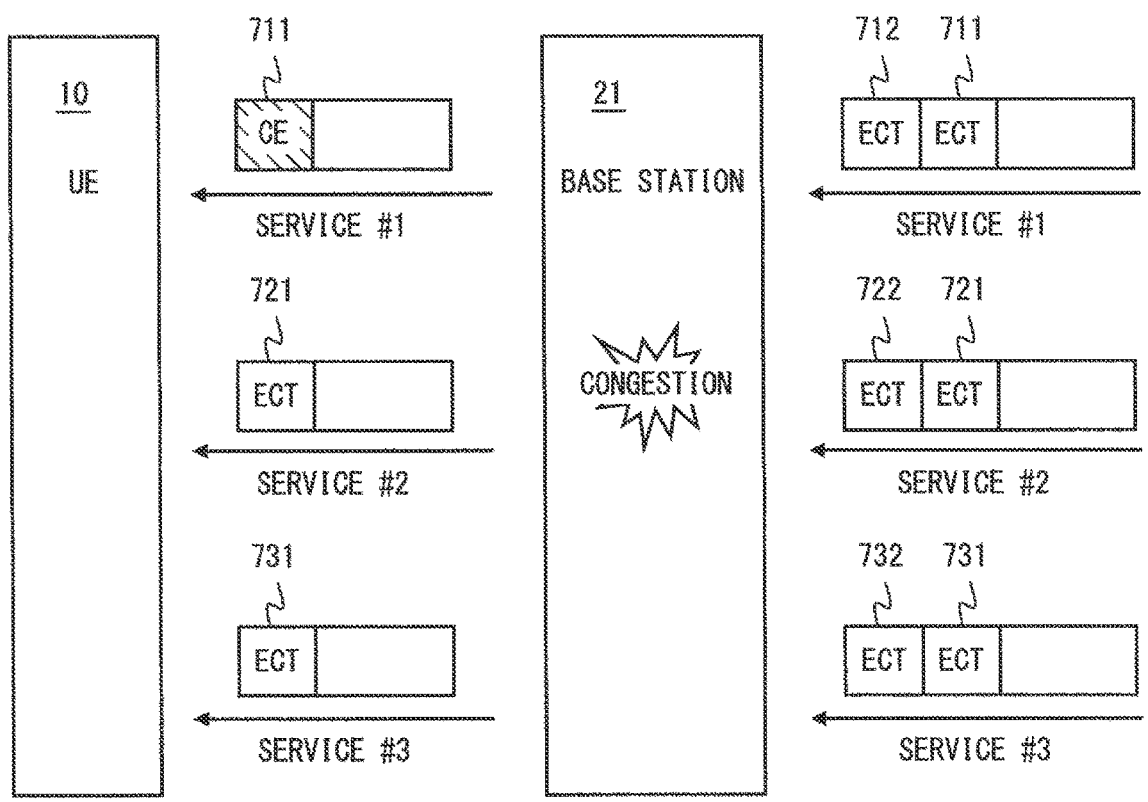
FIG. 4 is a sequence diagram for explaining an illustrative operation performed by a base station according to embodiments.

FIG. 4 illustrates an example of an operation to set CE codepoints to downlink user packets when the base station 21 detects congestion. The base station 21 receives downlink user packets of the services #1, #2 and #3 through different bearers (e.g., GTP tunnels). In the example in FIG. 4, the ECT codepoints have been set to all of IP headers (inner headers) 711, 721 and 723 of downlink user packets received by the base station 21, and the ECT codepoints have been set to all of outer headers 712, 722 and 732. That is, ECN has been, enabled for all of the services #1 to #3, and congestion has not been detected on the upstream side of the base station 21. The base station 21, which has detected the congestion, sets the CE codepoint to the IP header 711 of the downlink user packet of the service #1, and then transfers the packet to the mobile terminal 10 through a radio bearer. Meanwhile, congestion indication markings to user packets of the services #2 and #3 are not permitted, and therefore the base station 21 transfers these packets to the mobile terminal 10 through radio bearers without rewriting the ECT codepoints within the IP headers 721 and 731 of the downlink user packets related to the services #2 and #3.

FIG. 5 illustrates an operation of the base station 21 when the CE codepoints have been set to the outer headers 712, 722 and 732 of downlink user packets of the services #1, #2 and #3 received by the base station 21. The situation shown in FIG. 5 would occur, for example, when the router 51 is not controlled by the C-plane node 31. and congestion indication markings are commonly set to ECN-enabled packets in the router 51. Since congestion indication markings to user packets of the service #1 is permitted, the base station 21 sets the CE codepoint to the IP header 711 of the service #1 according to the CE codepoint within the outer header 712. Meanwhile, the base station 21 does not rewrite the ECT codepoints within the IP headers 721 and 731 of the user packets related to the services #2 and #3, for which congestion indication markings are not permitted.

FIG. 6 illustrates an operation of the base station 21 when the CE codepoints have already been set to the inner headers (IP headers) 711, 721 and 731 of downlink user packets of the services #1, #2 and #3 received by the base station 21. The base station 21 is only restricted to rewrite the ECN fields of user packets related to the services #2 and #3. Hence, when the CE codepoints have already been set. to the ECN fields of the downlink user packets related to the services #2 and #3, the base station 21 transfers to the mobile terminal 10 the downlink user packets related to the services #2 and #3 whose IP headers 721 and 731 are set with the CE codepoints. That is, in the example in FIG. 6, the CE codepoints are set to the downlink user packets of the services #1 to #3 transmitted from the base station 21 to the mobile terminal 10.

FIG. 7 illustrates an example of an operation to set CE codepoints to uplink user packets when the U-plane node 32 (e.g., SGSN or S-GW) detects congestion) detects congestion. The U-plane node 32 receives tunnel packets that encapsulate uplink user packets, through a bearer (e.g., GTP tunnel) established between the U-plane node 32 and the base station 21. In an example in FIG. 7, the ECT codepoints have been set to the IP headers (inner headers) 611, 621 and 631 and the outer headers 612, 622 and 632 related to the services #1 to #3 received by the U-plane node 32. That is, ECN has been enabled for all of the services #1 to #3, and congestion has not been detected on the upstream side of the U-plane node 32. The U-plane node 32, which has detected the congestion, sets the CE codepoint to the IP header 611 of the uplink user packet of the service #1, and then transmits the packet through the bearer (e.g., GTP tunnel)

established between the U-plane node 32 and the U-plane node 33. The CE codepoint is also set to the outer header 812 of the tunnel packet related to the service #1. Meanwhile, since congestion indication markings to user packets of the services #2 and #3 are not permitted, the U-plane node 32 does not rewrite the ECT codepoints within the IP headers 621 and 631 of the uplink user packets related to the services #2 and 3, and set the ECT codepoints to the outer headers 822 and 832 of the tunnel packets related to the services #2 and #3.

FIG. 8 illustrates an example of an operation to set CE codepoints to uplink user packets when the router 51 arranged between the base station 21 and the U-plane node 32 detects congestion. The router 51 is not an end point which terminates a bearer (GTP tunnel), and therefore performs routing and forwarding tunnel packets according to their outer headers 612, 622 and 632. The router 51 sets the CE codepoint to the outer header 612 of the tunnel packet related to the service #1. Meanwhile, since congestion indication markings to user packets of the services #2 and #3 are not permitted, the router 51 does not rewrite the ECT codepoints within the outer headers 622 and 632 of the tunnel packets related to the services #2 and 3.

Figure 9:
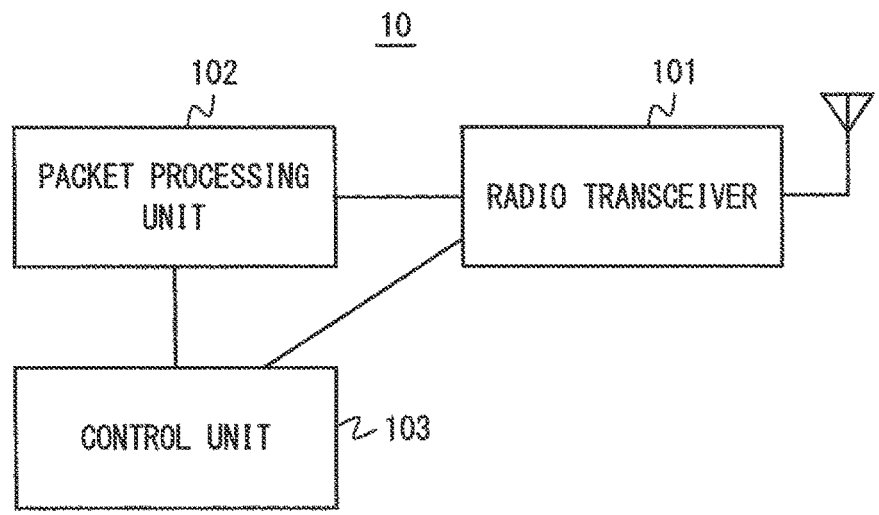
FIG. 9 is a diagram showing an illustrative configuration of a mobile terminal according embodiments.

FIG. 9 shows a block diagram illustrating a configuration example of the mobile terminal 10. The radio transceiver 101 is configured to be connected to the mobile communication network 1 (i.e. RAN 20). The radio transceiver 101 has a function of communicating with the RAN 20 and establishes a radio connection with the base station 21. That is, the radio transceiver 101 establishes a downlink radio bearer with the base station 21, and receives from the base station 21 a downlink signal including a plurality of physical downlink channels. Further, the radio transceiver 101 establishes an uplink radio bearer with the base station 21, and transmits to the base station 21 an uplink signal including a plurality of physical uplink channels. Furthermore, the radio transceiver 101 performs layer-2 control (e.g., PDCP (Protocol Data Convergence Protocol), RLC (Radio Link Control) and MAC (Media Access Control)), and assembles and re-assembles data frames conveys user packets. The packet processing unit 102 processes user packets transmitted or received through the radio transceiver 101. That is, the packet processing unit 102 assembles and re-assembles user packets. The control unit 103 sends, to the mobile communication network 1 (e.g., C-plane node 31) through the radio transceiver 101, a request message indicating whether or not to permit the mobile communication network 1 to set congestion indication markings (e.g., CE codepoints) to ECN-enabled user packets. As described above, the request message may be transmitted using a NAS message to be transmitted to the C-plane node 31. The NAS message is, for example, an attach request, a service request, a bearer allocation request, a bearer modification request or a request for connection with an external network.

Figure 10:
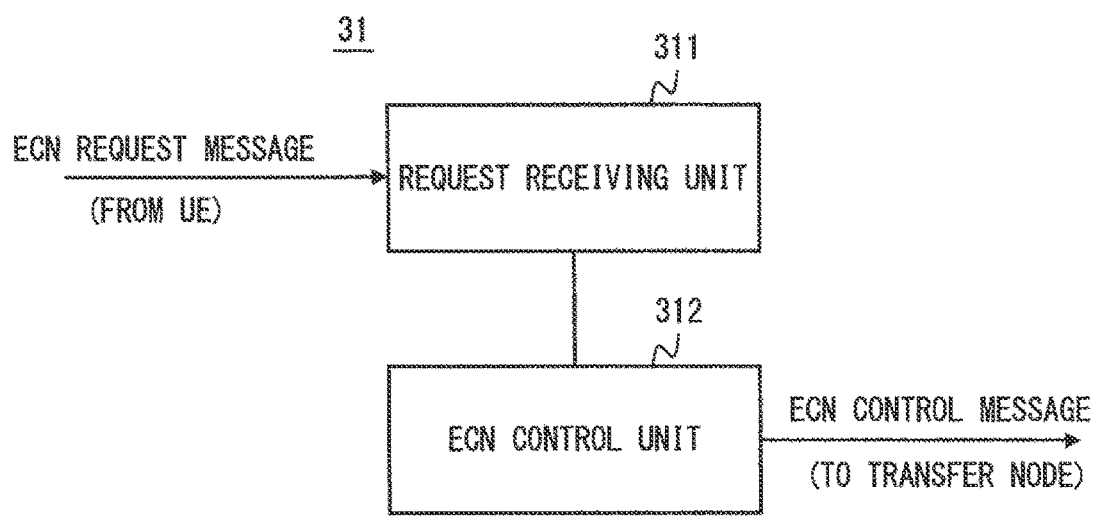
FIG. 10 is a diagram showing an illustrative configuration of a control plane node according embodiments.

FIG. 10 shows a block diagram illustrating a configuration example of the C-plane node 31. The request receiving unit 311 receives from the mobile terminal (UE) 10 the above request message related to ECN. In response to reception of the request message from, the mobile terminal 10, an ECN control unit 312 notifies the packet transfer node, within the mobile communication network 1, whether the setting of congestion indication markings to ECN-enabled user packets transmitted or received by the mobile terminal 10 is permitted or restricted. The C-plane node 31 may signal all transfer nodes (i.e. the base station 21, the U-plane nodes 32 and 33, and the routers 51 and 52) which involve in transferring user packets to the mobile terminal 10, and control the setting of congestion indication markings by all of these transfer nodes.

Alternatively, the C-plane node 31 may only control the setting of congestion, indication markings to user packets by nodes which can rewrite the ECN fields of user packets (i.e. the base station 21 and the U-plane nodes 32 and 33). The routers 51. and 52 only rewrite ECN fields of outer headers, and therefore a downstream node thereof (i.e., the base station 21 or the U-plane node 32 or 33) may ignore rewriting of the ECN fields of outer headers performed by the routers 51 and 52.

Further, alternatively, the C-plane node 31 may only control the setting of. congestion indication markings to user packets by nodes positioned at a boundary between the mobile communication network 1 and the mobile terminal 10 or between the mobile communication network 1 and the external network 40 (i.e. the base station 21 and the U-plane node 32). This alternative is sufficiently effective for architecture in which nodes between the base station 21 and the U-plane node 32 only operates the ECN field within an outer header and does not rewrite the ECN field of a user packet (i.e., the ECN field within an inner header).

Furthermore, alternatively, the C-plane node 31 may only control the setting of congestion indication markings to user packets by the base station 21. This alternative is sufficiently effective in architecture in which all nodes except the base station 21 do not rewrite the ECN field of a user packet (i.e., the ECN field within an inner header).

Figure 11:
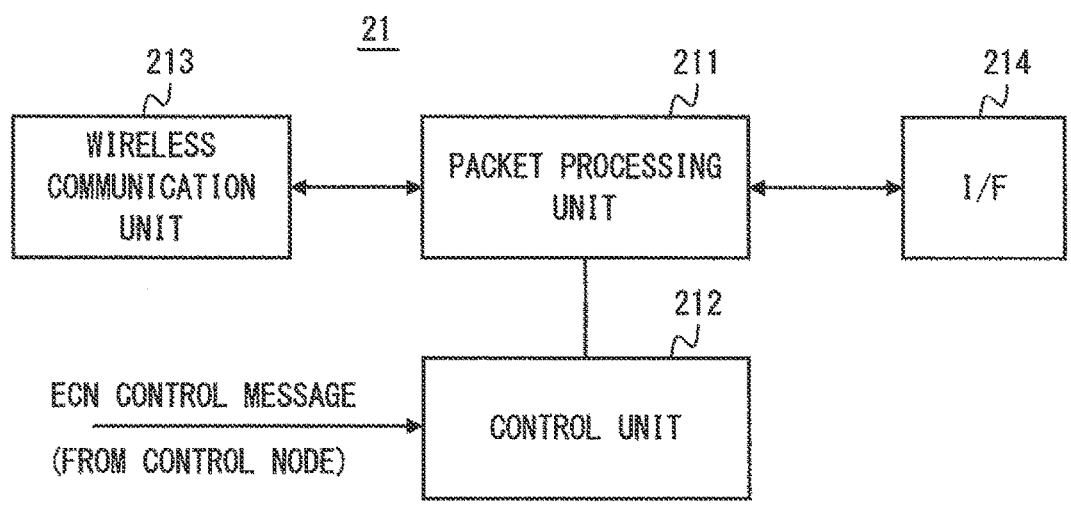
FIG. 11 is a diagram showing an illustrative configuration of a base station according embodiments.

FIG. 11 shows a block diagram illustrating a configuration example of the base station 21 as a packet transfer node. The packet processing unit 211 performs routing and forwarding of user packets, tunnel end point, processes (i.e. assembling and re-assembling tunnel packets), and routing and forwarding of tunnel packets. That is, the packet processing unit 211 receives uplink user packets from the wireless communication unit 213, and transmits downlink user packets to the wireless communication unit 213. The wireless communication unit 213 establishes radio bearers and physical radio channels with a plurality of mobile terminals 10, and transmits and receives downlink and uplink user packets to and from the mobile terminals 10. Further, the packet processing unit 211 sends uplink tunnel packets (e.g., GTP packets) to the communication interface 214, and receives downlink tunnel packets from the communication interface 214. The communication interface 214 is a wired or wireless interface for communicating with the core network 30 (or the router 51).

The packet processing unit 211 also supports ECN. That is, the packet processing unit 211 can set congestion indication markings to ECN-enabled user packets or tunnel, packets that encapsulate the user packets. The control, unit 212 receives from the C-plane node 31 a control message indicating whether or not to permit the setting of congestion indication markings, and controls the setting of congestion indication markings by the packet processing unit 211 in accordance with the control message. That is, the control unit 212 prevents the packet processing unit 211 from setting the congestion indication markings to the user packets of the mobile terminal 10 when setting the congestion indication markings to the ECN-enabled user packets of the mobile terminal 10 is restricted. In addition, as described above, the setting of congestion indication markings may be restricted per service used by the mobile terminal if) (or in bearer units or tunnel units). Further, the setting of congestion indication markings may be restricted collectively in uplink and downlink of the mobile terminal 10 or individually in uplink or downlink.

As described above, in the present embodiment, the mobile terminal 10 sends, to the mobile communication network 1 (e.g., C-plane node 31), a request message indicating whether or not to permit the setting of congestion indication markings to ECN-enabled user packets. In response to reception of the request message, the mobile communication network 1 (e.g., C-plane node 31) notifies at least one packet transfer node (e.g., base station 21) whether the setting of congestion indication markings is permitted or not. Further, at least one packet transfer node controls the selling of congestion indication markings to user packets of the mobile terminal 10. Consequently, in the present embodiment, the mobile terminal 10 can explicitly permit or restrict the setting of congestion indication markings to user packets, for example, in order to identify a point that congestion occurs. The mobile terminal 10 can thus control whether the setting of congestion indication markings in the mobile communication network 1 is permitted or not.

further, as described above, in one of the specific examples described in the present embodiment, the C-plane node 31 instructs at least one of packet transfer nodes (e.g., base station 21) whether the setting of congestion indication markings to user packets is permitted or restricted per individual mobile terminal, per individual transfer direction (uplink or downlink), per individual service, or per individual bearer. Consequently, the mobile communication network 1 can control the setting of congestion indication markings at a fine granularity, such as per mobile terminal or per service used by a mobile terminal. It is thus possible, for example, to reduce a load of a packet transfer node required to ECN processing. Further, it is possible, for example, to make it easier to identify a point that congestion occurs.

Second Embodiment

In the first embodiment, the case has been described where the mobile terminal 10 sends an instruction to the mobile communication network 1 to control whether or not to permit the mobile communication network 1 to set congestion indication markings to user packets. By contrast with this, the following describes the case where whether the setting of congestion indication markings to user packets is restricted or not is controlled in accordance with an instruction from other than that from the mobile terminal 10. In the present embodiment, for example, permission or restriction to set congestion indication markings to user packets is control led in accordance with a policy of a mobile operator. In addition, a configuration example of a mobile communication network according to the present embodiment may be the same as that in FIG. 1.

Figure 12:
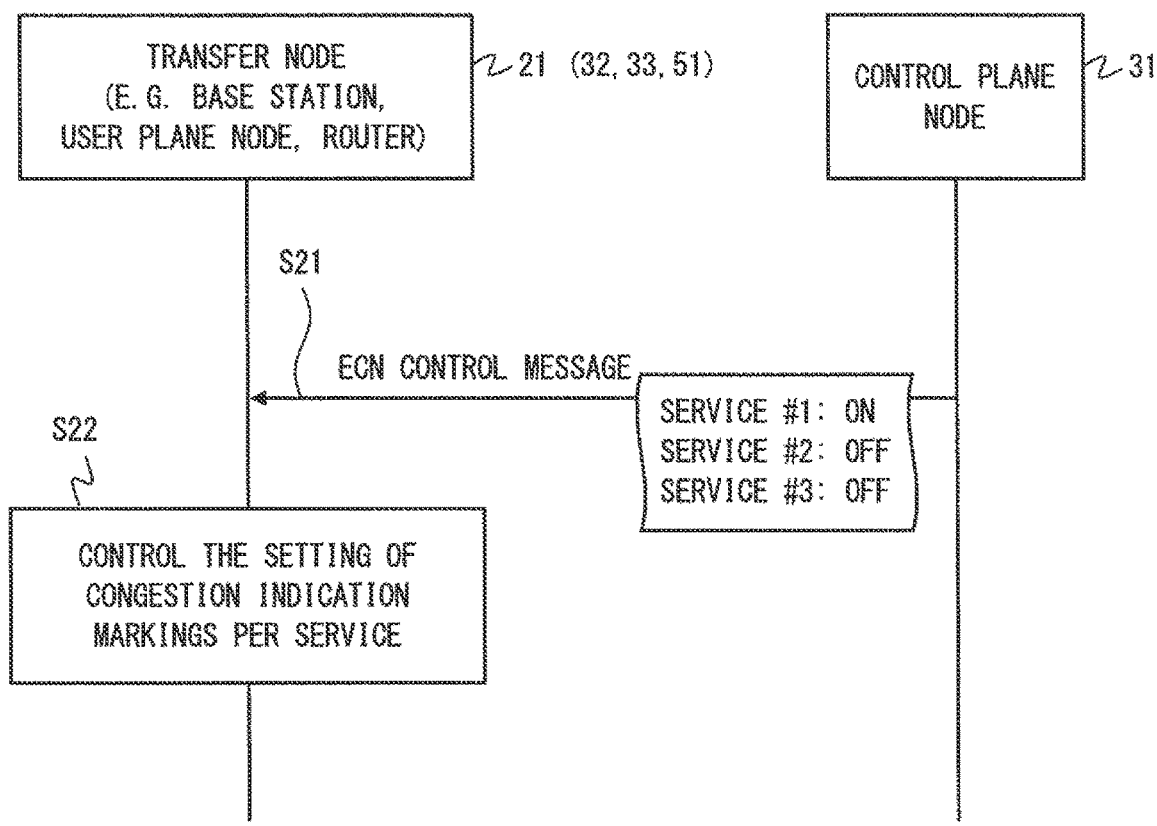
FIG. 12 is a sequence diagram showing an example of a procedure for controlling permission to set a congestion indication marking according to embodiments.

FIG. 12 shows a sequence diagram illustrating an example of a procedure for controlling permission to set congestion indication markings according to the present embodiment. In step S21, the C-plane node 31 sends a control message to at least one packet transfer node (e.g., the base station 21, the U-plane node 32 or 33 or the router 51 or 52). In an example in FIG. 12, the control message indicates whether or not to permit setting congestion indication markings per individual service used by the mobile terminal 10. As similar to the first embodiment, the control message may indicate whether or not to permit setting congestion indication markings per mobile terminal, per QoS level, or per bearer. In step S22, the packet transfer node controls the setting of congestion indication markings to user packets in accordance with the control message from the C-plane node 31.

Transmission of the control message in step S21 can be triggered by various factors. For example, the C-plane node 31 may receive subscriber data of the mobile terminal 10 managed by a subscriber server which is not illustrated, and then control permission to set congestion indication markings to user packets of the mobile terminal 10 based on the subscriber data. The subscriber server is a database which retains subscriber data of the mobile terminal 10, and corresponds to, for example, a HSS (Home Subscriber Server) or a HLR (Home Location Server). Further, subscriber data may include a setting policy related to permission to set congestion indication markings. For example, the C-plane node 31 may obtain subscriber data from the subscriber server in response to reception of a NAS message (e.g., attach request) from the mobile terminal 10, and retain the subscriber data as a contest (e.g., UE CONTEXT) related to the mobile terminal 10. Further, for example, when obtaining subscriber data in response to a location update request (e.g., TAU (Tracking Area Update) request) from the mobile terminal 10, the C-plane node 31 may obtain subscriber data of the mobile terminal 10 from an old C-plane node instead of the subscriber server. The old C-plane node is a node (e.g., a SGSN and a MME) which manages location registration areas at. which the mobile terminal 10 was positioned in the past, and retains subscriber data received from, the subscriber server upon attach of the mobile terminal 10.

In the present embodiment, the C-plane node 31 instructs at least one packet transfer node (e.g., base station 21) whether the setting of congestion indication markings to user packets is permitted or restricted per mobile terminal, per transfer direction (uplink or downlink), per service, or per bearer. Consequently, the mobile communication network 1 can control the setting of congestion indication markings at a fine granularity such as per mobile terminal or per service used by a mobile terminal. It is thus possible, for example, to reduce a load of a packet transfer node required to ECN processing. Further, it is possible, for example, to make it easier to identify a point that congestion occurs.

Other Embodiments

The first and second embodiments may be appropriately combined.

The processing, performed by at least one of the mobile terminal 10, C-plane node 31, and packet transfer node (e.g., the base station 21, the U-plane node 32 or 33 or the router 51 or 52), for controlling permission to set congestion indication markings described in the first and second embodiments may be implemented by using a semiconductor processing device including an ASIC (Application Specific Integrated Circuit). Further, the processing may he implemented by causing a computer system including at least one processor (e.g., a microprocessor, an MPU or a DSP (Digital Signal Processor)) to execute a program. More specifically, one or more programs including instructions for causing a computer system to perform the algorithms for determining a PA described with reference to the flowcharts and sequence diagrams may be created and supplied to a computer system. The control for updating a location registration area, performed by the mobility management node 300 and the base station 200, described in the fifth embodiment may also be implemented by causing a computer system to execute a program.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical, disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Furthermore, the embodiments stated above are merely examples of application of the technical ideas obtained by the present inventor. Needless to say, these technical ideas are not limited to those described in the above embodiments and the reference embodiment, and may be changed in various ways.

For example, the whole or part of the illustrative embodiments disclosed above can be described as, but not limited to, the following supplementary notes.

(Supplementary Note A1)

A mobile terminal including:

wireless communication means for connecting to a mobile communication network;

control means for transmitting, to the mobile communication network through the wireless communication means, a message indicating whether or not to permit setting a congestion indication marking to an Explicit Congestion Notification (ECN)-enabled user packet, in the mobile communication network; and packet processing means for transmitting or receiving the user packet through the wireless communication means.

(Supplementary Note A2)

The mobile terminal according to supplementary note A1, in which the message indicates whether or not to permit setting the congestion indication marking per individual service used by the mobile terminal, per individual Quality of Service, QoS, level used by the mobile terminal, or per individual bearer related to the mobile terminal.

(Supplementary Note A3)

The mobile terminal according to supplementary note A1 or A2, in which the mobile communication network includes a radio access network and a core network, and the control means transmits the message to a control node in the core network.

(Supplementary Note A4)

The mobile terminal according to any one of supplementary notes A1 to A3, in which, the message triggers signaling in the mobile communication network for applying, to a packet transfer node within the mobile communication network, whether or not to permit setting the congestion display making.

(Supplementary Note A5)

The mobile terminal according to any one of supplementary notes A1 to A4, in which the mobile communication network includes a radio access network and a core network, and the message is a NAS (Non-Access Stratum) message to be transmitted to the core network.

(Supplementary Note A6)

The mobile terminal according to supplementary notes A5, in which the message includes at least one of an Attach Request message, a Service Request message, a PDN connectivity request message, a Bearer Resource Allocation Request message, and a Bearer Resource Modification Request message.

(Supplementary Note A7)

The mobile terminal according to any one of supplementary notes A1 to A6, in which the user packet includes an IP (Internet Protocol) packet whose header is set with an ECT (ECN-Capable Transport) codepoint.

(Supplementary Note A8)

The mobile terminal according to any one of supplementary notes A1 to A7, in which the congestion indication marking includes a CE (Congestion Experienced) codepoint set to a packet header of the user packet or an outer header encapsulating the user packet.

(Supplementary Note A9)

A method performed by a mobile terminal for controlling congestion, the method including transmitting, to a mobile communication network through wireless communication means, a message indicating whether or not to permit setting a congestion indication marking to an Explicit Congestion Notification (ECN)-enabled user packet in the mobile communication network.

(Supplementary Note A10)

The method according to supplementary note A9, in which the message indicates whether or not to permit setting the congestion indication marking per individual service used by the mobile terminal, per individual Quality of Service, QoS, level used by the mobile terminal, or per individual bearer related to the mobile terminal.

(Supplementary Note A11)

The method according to supplementary note A9 or A10, in which the mobile communication network includes a radio access network and a core network, and the transmitting includes transmitting the message to a control node in the core network.

(Supplementary Note A12)

The method according to any one of supplementary notes A9 to A11 in which the message triggers signaling in the mobile communication network for applying, to a packet transfer node within the mobile communication network, whether or not to permit setting the congestion display making.

(Supplementary Note A13)

The method according to any one of supplementary notes A9 to A12, in which the mobile communication network includes a radio access network and a core network, and the message is a NAS (Non-Access Stratum) message to be transmitted to the core network.

(Supplementary Note A14)

The method according to supplementary notes A13, in which the message includes at least one of an Attach Request message, a Service Request message, a PDN connectivity request message, a Bearer Resource Allocation Request message, and a Bearer Resource Modification Request message.

(Supplementary Note A15)

The method according to any one of supplementary notes A9 to A14, further including transmitting or receiving the user packet through the wireless communication means.

(Supplementary Note A17)

The method according to any one of supplementary notes A9 to A15, in which the user packet includes an IP (Internet Protocol) packet whose header is set with an ECT (ECN-Capable Transport) codepoint.

(Supplementary Note A18)

The method according to any one of supplementary notes A9 to A17, in which the congestion indication marking includes a CE (Congestion Experienced) codepoint set to a packet header of the user packet or an outer header encapsulating the user packet.

(Supplementary Note A19)

A program causing a computer to perform a method in a mobile terminal for controlling congestion, the method including transmitting, to a mobile communication network through wireless communication means, a message indicating whether or not to permit setting a congestion indication marking to an Explicit Congestion Notification (ECN)-enabled user packet in the mobile Communication network.

(Supplementary Note B1)

A control node arranged in a mobile communication network, including control means for notifying a packet transfer node within the mobile communication, network whether the setting of a congestion indication marking to an Explicit Congestion Notification (ECN)-enabled user packet transmitted or received by a mobile terminal is permitted or not.

(Supplementary Note B2)

The control node according to supplementary note B1, in which the control means transmits a control message to the packet transfer node, and the control message indicates at least one of the mobile terminal, a service used by the mobile terminal, a Quality of Service, QoS, level used by the mobile terminal, and a bearer related to the mobile terminal, as a target for which the setting of the congestion indication marking is permitted or restricted.

(Supplementary Note B3)

The control node according to supplementary note B1 or B2, further including receiving means for receiving, from the mobile terminal, a request message indicating whether or not to permit setting the congestion indication marking to an Explicit Congestion Notification (ECN)-enabled user packet in the mobile communication network.

(Supplementary Note B4)

The control node according to supplementary note B3, in which the request message indicates whether or not to permit setting the congestion indication marking per individual service used by the mobile terminal, per individual Quality of Service (QoS) level, used by the mobile terminal, or per individual bearer related to the mobile terminal.

(Supplementary Note B5)

The control node according to supplementary note B3 or B4, in which the mobile communication network, includes a radio access network and a core network, the control node is arranged in the core network, and the request message is a NAS (Non-Access Stratum) message to be transmitted to the core network.

(Supplementary Note B6)

The control node according to supplementary note B5, in which the request message includes at least one of an Attach Request message, a Service Request message, a PDN connectivity request message, a Bearer Resource Allocation Request message, and a Bearer Resource Modification Request message.

(Supplementary Note B7)

The control node according to any one of supplementary notes B1 to B6, in which the user packet includes an IP (internet Protocol) packet whose header is set with an ECT (ECN-Capable Transport) codepoint.

(Supplementary Note B8)

The control node according to any one of supplementary notes B1 to B7, in which the congestion indication marking includes a CE (Congestion Experienced) codepoint set to a packet header of the user packet or an outer header encapsulating the user packet.

(Supplementary Note B9)

A method, performed, by a control node arranged in a mobile communication network, for controlling congestion, the method including notifying a packet transfer node within the mobile communication network whether the setting of a congestion indication marking to an Explicit Congestion Notification (ECN)-enabled user packet transmitted or received by a mobile terminal is permitted or not.

(Supplementary Note B10)

The method according to supplementary note B9, in which the notifying includes transmitting a control message to the packet transfer node, and the control message indicates at least one of the mobile terminal, a service used by the mobile terminal, a Quality of Service, QoS, level used by the mobile terminal, and a bearer related to the mobile terminal, as a target for which the setting of the congestion indication marking is permitted or restricted.

(Supplementary Note B11)

The method according to supplementary note B9 or B10, further including receiving from the mobile terminal, a request message indicating whether to permit setting the congestion indication marking to an Explicit Congestion Notification (ECN)-enabled user packet in the mobile communication network.

(Supplementary Note B12)

The method according to supplementary note B11, in which the request message indicates whether or not to permit setting the congestion indication marking per individual service used by the mobile terminal, per individual Quality of Service (QoS) level used by the mobile terminal, or per individual, bearer related to the mobile terminal.

(Supplementary Note B13)

The method according to supplementary note B11 or B12, in which the mobile communication network includes a radio access network and a core network, the control node is arranged in the core network, and the request message is a NAS (Non-Access Stratum) message to be transmitted to the core network.

(Supplementary Note B14)

The method according to supplementary note B13, in which the request message includes at least one of an Attach Request message, a Service Request message, a PDN connectivity request message, a Bearer Resource Allocation Request message, and a Bearer Resource Modification Request message.

(Supplementary Note B15)

The method node according to any one of supplementary notes B9 to B14, in which the user packet includes an IP (Internet Protocol) packet whose header is set with an ECT (ECN-Capable Transport) codepoint.

(Supplementary Note B16)

The method according to any one of supplementary notes B9 to B15, in which the congestion indication marking includes a CE (Congestion Experienced) codepoint set to a packet header of the user packet or an outer header encapsulating the user packet.

(Supplementary Note B17)

A program causing a computer to perform a method in a control node, arranged in a mobile communication network, for controlling congestion, the method including notifying a packet transfer node within the mobile communication network, whether the setting of a congestion indication marking to an Explicit Congestion Notification (ECN)-enabled user packet transmitted or received by a mobile terminal is permitted or not.

(Supplementary Note C1)

A packet transfer node, arranged in a mobile communication network, including:

packet processing means for setting a congestion indication marking to an Explicit Congestion Notification (ECN)-enabled user packet or a tunnel packet that encapsulates the user packet; and control means for controlling the setting of the congestion indication marking by the packet processing means, in accordance with a control message indicating whether or not to permit setting the congestion indication marking, in which the control message indicates at least one of the mobile terminal, a service used by the mobile terminal, a Quality of Service, QoS, level used by the mobile terminal, and a bearer related to the mobile terminal, as a target for which the setting of the congestion indication marking is permitted or restricted.

(Supplementary Note C2)

The packet transfer node according to supplementary note C1, in which the control message is transmitted from a control node within the mobile communication network to the packet transfer node.

(Supplementary Note C3)

The packet transfer node according to supplementary note C2, in which the control message is transmitted from the control node to the packet transfer node in response to a request from the mobile terminal.

(Supplementary Note C4)

The packet transfer node according to any one of supplementary notes C1 to C3, in which the control means applies, to the packet processing means, whether or not to permit setting the congestion indication marking per individual service used by the mobile terminal, per individual Quality of Service (QoS) level used by the mobile terminal, and per individual bearer related to the mobile terminal.

(Supplementary Note C5)

The packet transfer node according to any one of supplementary notes C1 to C4, in which the mobile communication network includes a radio access network and a core network, and the packet transfer node is a base station arranged in the radio access network or a user plane node arranged in the core network.

(Supplementary Note C6)

The packet transfer node according to any one of supplementary notes C1 to C5, in which the user packet includes an IP (Internet Protocol) packet whose header is set with an ECT (ECN-Capable Transport) codepoint.

(Supplementary Note C7)

The packet transfer node according to any one of Supplementary Notes C1 to C6, in which the congestion indication marking includes a CE (Congestion Experienced) codepoint set to a packet header of the user packet or an outer header of the tunnel packet.

(Supplementary Note C8)

A method, performed by a packet transfer node arranged in a mobile communication network, for controlling congestion, the method including:

controlling the setting of a congestion .indication marking in accordance with a control message indicating whether or not to permit selling the congestion indication marking; and on a condition that the setting of the congestion indication marking has been permitted in the controlling, setting the congestion indication marking to an Explicit Congestion Notification-, ECN-, enabled user packet or a tunnel packet that encapsulates the user packet, in which the control message indicates at least one of the mobile terminal, a service used by the mobile terminal, a Quality of Service, QoS, level used by the mobile terminal, and a bearer related to the mobile terminal, as a target for which the setting of the congestion indication marking is permitted or restricted.

(Supplementary Note C9)

The method according to supplementary note C8, further including receiving the control message from a control node within the mobile communication network.

(Supplementary Note C10)

The method according to supplementary note C9, in which the control message is transmitted from the control node to the packet transfer node in response to a request from the mobile terminal.

(Supplementary Note C11)

The method according to any one of supplementary notes C8 to C10, in which the controlling includes applying whether or not to permit setting the congestion indication marking per individual service used by the mobile terminal, per individual Quality of Service (QoS) level used by the mobile terminal, and per individual bearer related to the mobile terminal.

(Supplementary Note C12)

The method according to any one of supplementary notes C8 to C11, in which the user packet includes an IP (Internet Protocol) packet whose header is set with an ECT (ECN-Capable Transport) codepoint.

(Supplementary Note C13)

The method according to any one of Supplementary Notes C8 to C12, in which the congestion indication marking includes a CE (Congestion Experienced) codepoint set to a packet header of the user packet or an outer header of the tunnel packet.

(Supplementary Note C14)

A program causing a computer to perform a method in a packet transfer node, arranged in a mobile communication network, for controlling congestion, the method including:

controlling the setting of a congestion indication marking in accordance with a control message indicating whether or not to permit setting the congestion indication marking; and on a condition that the setting of the congestion indication marking has been permitted in the controlling, setting the congestion indication marking to an Explicit Congestion Notification-, ECN-, enabled user packet or a tunnel packet that encapsulates the user packet, in which the control message indicates at least one of the mobile terminal, a service used by the mobile terminal, a Quality of Service, QoS, level used by the mobile terminal, and a bearer related to the mobile terminal, as a target for which the setting of the congestion indication marking is permitted or restricted.

This application is based upon and. claims the benefit of priority from Japanese Patent Application No. 2012-169647 filed on Jul. 31, 2012, and the disclosure of which is incorporated herein in its entirety by reference.

REFERENCE SIGNS LIST

1 MOBILE COMMUNICATION NETWORK
10 MOBILE TERMINAL
20 RADIO ACCESS NETWORK (RAN)
21 BASE STATION
30 CORE NETWORK

31 CONTROL PLANE NODE (C-PLANE NODE)
32, 33 USER PLANE NODES (U-PLANE NODE)
40 EXTERNAL NETWORK
41, 42 ROUTERS
43 END NODE
51, 52 ROUTERS
101 RADIO TRANSCEIVER
102 PACKET PROCESSING UNIT
103 CONTROL UNIT
211 PACKET PROCESSING UNIT
212 CONTROL UNIT
213 WIRELESS COMMUNICATION UNIT
214 COMMUNICATION INTERFACE
311 REQUEST RECEIVING UNIT
312 ECN PROCESSING UNIT

The invention claimed is:

1. A mobile terminal comprising:
a wireless communication unit comprising at least one hardware processor configured to be connected to a mobile communication network;
a control unit comprising at least one hardware processor configured to transmit, to a control plane node in the mobile communication network through the wireless communication unit, a message indicating whether or not to permit setting a congestion indication marking to an Explicit Congestion Notification- (ECN-) enabled user packet in the mobile communication network, the ECN-enabled user packet being originated by or destined for the mobile terminal, the message being other than the ECN-enabled user packet and causing the control plane node to notify a packet transfer node within the mobile communication network whether or not to permit the setting of the congestion indication marking; and
a packet processing unit comprising at least one hardware processor configured to transmit or receive the ECN-enabled user packet through the wireless communication unit.

2. The mobile terminal according to claim 1, wherein the message indicates whether or not to permit setting the congestion indication marking per individual service used by the mobile terminal, per individual Quality of Service (QoS) level used by the mobile terminal, or per individual bearer related to the mobile terminal.

3. The mobile terminal according to claim 1, wherein
the mobile communication network includes a radio access network and a core network, and
the control unit is configured to transmit the message to the control node in the core network.

4. The mobile terminal according to claim 1, wherein the message triggers signaling in the mobile communication network for applying, to the packet transfer node within the mobile communication network, whether or not to permit setting the congestion indication marking.

5. The mobile terminal according to claim 1, wherein
the mobile communication network includes a radio access network and a core network, and
the message is a Non-Access Stratum (NAS) message to be transmitted to the core network.

6. The mobile terminal according to claim 5, wherein the message includes at least one of an Attach Request message, a Service Request message, a PDN connectivity request message, a Bearer Resource Allocation Request message, and a Bearer Resource Modification Request message.

7. The mobile terminal according to claim 1, wherein the user packet includes an Internet Protocol (IP) packet whose header is set with an ECN-Capable Transport (ECT) codepoint.

8. The mobile terminal according to claim 1, wherein the congestion indication marking includes a Congestion Experienced (CE) codepoint set to a packet header of the user packet or an outer header encapsulating the user packet.

9. A method performed by a mobile terminal for controlling congestion, the method comprising:
transmitting, to a control plane node in a mobile communication network through a wireless communication unit, a message indicating whether or not to permit setting a congestion indication marking to an Explicit Congestion Notification- (ECN-) enabled user packet in the mobile communication network, the ECN-enabled user packet being originated by or destined for the mobile terminal, the message being other than the ECN-enabled user packet and causing the control plane node to notify a packet transfer node within the mobile communication network whether or not to permit the setting of the congestion indication marking.

10. The method according to claim 9, wherein the message indicates whether or not to permit setting the congestion indication marking per individual service used by the mobile terminal, per individual Quality of Service (QoS) level used by the mobile terminal, or per individual bearer related to the mobile terminal.

11. The method according to claim 9, wherein
the mobile communication network includes a radio access network and a core network, and
the transmitting includes transmitting the message to the control node in the core network.

12. The method according to claim 9, wherein the message triggers signaling in the mobile communication network for applying, to the packet transfer node within the mobile communication network, whether or not to permit setting the congestion indication marking.

13. A control node arranged in a mobile communication network, comprising:
at least one memory that stores instructions; and
at least one processor configured to execute the instructions to execute modules comprising
a control module configured to:
receive, from a mobile terminal or a subscriber server, information indicating whether setting of a congestion indication marking to an Explicit Congestion Notification- (ECN-) enabled user packet originated by or destined for a mobile terminal is permitted or not, the information being other than the ECN-enabled user packet, and
notify a packet transfer node within the mobile communication network whether or not to permit the setting of the congestion indication marking.

14. The control node according to claim 13, wherein
the control module is configured to transmit a control message to the packet transfer node, and
the control message indicates at least one of the mobile terminal, a service used by the mobile terminal, a Quality of Service (QoS) level used by the mobile terminal, and a bearer related to the mobile terminal, as a target for which the setting of the congestion indication marking is permitted or restricted.

15. The control node according to claim 13, wherein the modules further comprise a receiving module configured to receive, from the mobile terminal, a request message indicating whether or not to permit setting the congestion indication marking to an Explicit Congestion Notification (ECN)-enabled user packet in the mobile communication network.

16. The control node according to claim 15, wherein the request message indicates whether or not to permit setting the congestion indication marking per individual service used by the mobile terminal, per individual Quality of Service (QoS) level used by the mobile terminal, or per individual bearer related to the mobile terminal.

17. The control node according to claim 15, wherein
the mobile communication network includes a radio access network and a core network,
the control node is arranged in the core network, and
the request message is a Non-Access Stratum (NAS) message to be transmitted to the core network.

18. The control node according to claim 17, wherein the request message includes at least one of an Attach Request message, a Service Request message, a PDN connectivity request message, a Bearer Resource Allocation Request message, and a Bearer Resource Modification Request message.

19. The control node according to claim 13, wherein the user packet includes an Internet Protocol (IP) packet whose header is set with an ECN-Capable Transport (ECT) codepoint.

20. The control node according to claim 13, wherein the congestion indication marking includes a Congestion Experienced (CE) codepoint set to a packet header of the user packet or an outer header encapsulating the user packet.

\* \* \* \* \*